United States Patent [19]

Glaeser

[11] Patent Number: 4,460,543
[45] Date of Patent: Jul. 17, 1984

[54] PROCESS FOR PREPARATION OF ZINC POWDER FOR ALKALINE BATTERIES BY AMALGAMATION OF ZINC POWDER

[75] Inventor: Wolfgang Glaeser, Goslar, Fed. Rep. of Germany

[73] Assignee: Grillo-Werke AG, Duisburg-Hamborn, Fed. Rep. of Germany

[21] Appl. No.: 482,605

[22] Filed: Apr. 6, 1983

[30] Foreign Application Priority Data

Apr. 10, 1982 [DE] Fed. Rep. of Germany ....... 3213386
Apr. 10, 1982 [DE] Fed. Rep. of Germany ....... 3213387

[51] Int. Cl.$^3$ ............................................. C22C 18/00
[52] U.S. Cl. .................................... 420/513; 429/230
[58] Field of Search ............... 420/513, 590; 75/0.5 B, 75/951, 251; 429/230

[56] References Cited

U.S. PATENT DOCUMENTS 3,764,338 10/1973 Marincic ............................ 420/513

FOREIGN PATENT DOCUMENTS 54-129322 10/1979 Japan ................................. 429/230

Primary Examiner—L. Dewayne Rutledge
Assistant Examiner—Robert L. McDowell
Attorney, Agent, or Firm—Wegner & Bretschneider

[57] ABSTRACT

Zinc powder containing mercury for alkaline batteries are prepared by reacting zinc powder with metallic mercury in the presence of amalgamation aids with agitation in a closed system, at a partial oxygen pressure of less than 100 mbar, while the volatile parts are continually exhausted, then raising the partial value of atmosphere air. Additional alloying elements can be added to reduce the gas development, by mixing zinc powder with metallic mercury in which is dissolved a part or the entire quantity of the required alloying elements.

10 Claims, No Drawings

PROCESS FOR PREPARATION OF ZINC POWDER FOR ALKALINE BATTERIES BY AMALGAMATION OF ZINC POWDER

The subject of this invention is a method for making zinc powder containing mercury and, in particular, with a mercury content of 0.1–10% by weight, as needed for alkaline batteries, by the amalgamation of zinc powder with metallic mercury and amalgamation aids.

The properties of the battery are influenced unfavorably by impurities of zinc and of other components of the batteries. Contamination of the zinc can bring about a situation in which the over voltage is reduced which means that the dissolution of the zinc is accelerated with the development of hydrogen. This so-called gassing of the zinc in the alkaline electrolyte on the one hand leads to zinc consumption without electrical energy discharge and, on the other hand, due to the generation of gas, leads to the impairment of the properties of the battery and to the destruction of the battery.

To reduce the gas development, which is caused by the reduction of the voltage due to contaminations, the zinc for alkaline batteries is therefore amalgamated. The amalgamation of zinc powder can be accomplished in various ways.

It is known from German Application DE-OS 24 41 356 that one can pulverize zinc with the desired mercury content in a gas current. For this purpose, the melted zinc is mixed homogeneously with mercury and the melt is jet sprayed into the gas current. This method has a number of advantages. The most important advantage certainly is that, due to the distribution of the mercury in the melt, it is assured that all powder particles actually contain mercury. This distribution of the mercury in the body of powder, however, also represents a disadvantage. Gassing is caused exclusively by contaminations on the surface of the powder particles. Due to the distribution of the mercury in the body of the powder particles, only a relatively small part of the mercury is available on the surface of the powder particles for the passivation of the impurities.

Therefore, it is necessary in this method to put more mercury into the zinc powder than would actually be necessary for the passivation of the impurities on the surface. Furthermore, impurities, which develop only after the formation of the powder or which come into contact with the powder, are not rendered passive by the formation of amalgam. Because gassing is a surface effect, the small powder particles with a relatively large surface contribute more to gassing than large powder particles. The passivation of the relatively large surface of small powder particles requires relatively more mercury than the passivation of larger particles. A considerable portion of the mercury added to the alloy is evaporated from the developing powder particles during the jet spraying of a mercury-zinc alloy. It has been determined that up to 10% of the mercury is lost during spraying to form the powder particles. Because the small powder particles have relatively more surface area than the large particles, the mercury loss of the small particles is relatively greater. But it is especially the small particles that require more mercury than the big ones.

The pulverization of mercury-zinc alloys in the gas current furthermore requires considerable protective measures to separate the mercury out of the air in the spraying process. Finally, another essential disadvantage of this method is represented by the fact that, during spraying, there develops a considerable proportion of faulty granules which contain the relatively expensive mercury. The reuse, in particular the remelting of the fine granules creates considerable difficulties and thus represents a significant cost factor.

Another method for preparing zinc powder with adequate mercury content for alkaline batteries consists in the subsequent amalgamation of pure zinc powder. However, in this method both the oxide coating of the zinc powder and that of the mercury droplets hinder the amalgamation. Zinc powder and mercury thus can be completely and perfectly mixed with each other only if these oxide layers are removed or if their buildup is prevented from the beginning.

It is known that one can amalgamate zinc powder in the electrolyte of the battery. This method likewise reveals a series of disadvantages. On the one hand, the thickening agent in the electrolyte prevents uniform and thorough mixing and thus the amalgamation. If, on the other hand, amalgamation is carried out in the electrolyte without using thickening agents, the presence of the zinc powder interferes with the uniform distribution of the thickening agent. Besides, this type of amalgamation can be performed only immediately prior to the production of the battery.

If the amalgamation of the zinc powder is accomplished not in the electrolyte but with the addition of diluted alkali, this process must be followed by thorough washing, because traces of acid or alkali can have a disadvantageous effect on the battery mechanism. Especially when one does not use metallic mercury, but rather mercury compounds, for amalgamation, their anions must be thoroughly removed by washing. If the amalgamation is not performed by the battery plants, the amalgamated zinc powder must be dried after the washing before shipment. Here one encounters more problems which begin to be observed already in the washing operation. Because the oxide coating of the zinc powder particles must be removed for amalgamation, the zinc powder reacts spontaneously with neutral water and the air used for drying. This causes, i.a., uncontrollable oxidations which can render the powder unsuitable for use into the batteries. Excessively thick oxide coating of zinc powder reduces the electrical conductivity of a zinc-powder-containing anode and leads to a high internal resistance of the battery.

Another problem connected with subsequently amalgamated zinc powder is the control of the pouring density. It depends to a considerable degree on the mercury content, on the grain size, on the grain shape, and, in a hitherto uncontrollable manner, on miscellaneous process conditions.

The present invention has the object of providing an improved method for making zinc powder with a mercury content of 0.1–10% by weight for alkaline batteries using the amalgamation of zinc powder with metallic mercury and amalgamation aids. This method is designed to avoid the above-mentioned disadvantages according to the state of the art and to provide a high-quality product on a reliable and controllable basis at a reasonable cost.

This problem is solved surprisingly by causing the zinc powder, while stirring in a closed system in which the partial oxygen pressure is less than 100 mbar, preferably less than 20 mbar, to react with amalgamation aids and metallic mercury, while continually removing the excess of amalgamation aids, their volatile parts, water vapor, as well as any possibly developing gaseous reactions products, and by then raising the partial oxygen pressure in a controlled and carefully adjusted manner to the value of the atmosphere. In this way one can specifically adjust not only the electrical properties but, rather surprisingly, also the pouring density.

To carry out the method according to the invention, zinc powder, with the desired particle size distribution required for batteries, is placed in a mixing vessel, the shell of which can be heated to temperatures between 20° and 200° C. The mixing vessel is flushed with gas or it is evacuated so that the partial oxygen pressure is less than 100 and, preferably less than 20 mbar. While stirring, the quantity of metallic mercury needed for amalgamation, as well as the required quantity of the amalgamation aid, are added from suitable storage containers.

Suitable amalgamation aids are essentially all substances which are suitable for partially or entirely dissolving the superficial oxide layer of the zinc powder and preventing the formation of an oxide layer on the mercury droplet. Thus, gases, their solutions, especially aqueous solutions, as well as diluted aqueous acids and diluted aqueous alkalis are suitable. Preferred are those substances whereof excess as well as reaction products with the zinc powder can remain in the final product or are easily removable. Removal can basically be accomplished by washing. Particularly preferred are those amalgamation aids for which excess or reaction products can be removed from the mixing system through a gas stream so that one can avoid the step of a subsequently washing. Typical examples of preferred amalgamation aids thus are soda lye, potash lye, hydrochloric acid, acetic acid, formic acid, carbonic acid, ammonia, as well as nitrogen and noble gases. The quantity of amalgamation aids must be sufficient to prevent the oxide coating of the metallic mercury and to moisten the surface of the zinc powder particles that the existing oxide coating is partially attacked and that the mercury can thus penetrate unhindered.

During the mixing process, the mixing vessel is either constantly further evacuated or the flow of the protective gas is so regulated that low partial oxygen pressure will be maintained. As a result one can simultaneously and continually remove the excess as well as the volatile parts of the amalgamation aids, water vapor, and any developing gaseous reaction products. After the addition of the amalgamation aids and the mercury and after complete amalgamation of the zinc powder, the partial oxygen pressure is controlled in the system and is carefully raised to the value of the surrounding air. Depending upon the speed of the partial oxygen pressure increase and depending upon the temperature of the zinc powder, there results a more or less strong surface oxidation of the zinc powder. As a result of slow and controlled partial pressure elevation, one can achieve not only optimum electrical properties but, in addition and surprisingly, one can specifically adjust the pouring density of the powder. This is of special importance because differing pouring densities are required for different types of batteries. Regarding the resulting reoxidation, it should be noted that heat is generated in this process and this heat contributes to the complete drying of the zinc powder. After completion of controlled oxidation and complete removal of the excess of amalgamation aids, the powder can be removed from the mixing vessel and can without difficulty be stored, transported, and put into batteries.

A special advantage of the method according to the invention consists of the fact that the mercury is inserted only after the pulverization of the zinc so that only the particular desired grain fraction is amalgamated. During the spraying of a zinc amalgam melt, there develops a considerable portion of faulty grain which can be recovered only in an expensive manner and which adds considerable cost to the method.

In the method according to the invention, the mercury furthermore penetrates through the surface of the powder into the powder particles and is distributed therein through diffusion. As a result, mercury absorption increases in proportion to the specific surface of the powder particle. Smaller particles consequently have a correspondingly larger surface and due to their increased contribution to gassing have more mercury available for the passivation of impurities on the surface than do larger particles.

As a result of the absorption of the mercury by the surface, there is initially a stronger coating of the surface with mercury, that is precisely in the place where the mercury is really needed. This effect is increased due to the use of amalgamation aids because amalgamation aids attach preferably where there are impurities. The diffusion of the mercury into the powder particles assures a sufficient content also in the interior to prevent gas development. During the decomposition of the zinc powder particles, which is brought about by the electrical discharge of the battery, the mercury is not attacked so that, after the dissolution of the zinc, the mercury concentration of the zinc powder particles increases.

By means of amalgamation in a protective gas atmosphere or in a vacuum it is possible to use amalgamation aids and to remove their excess, as well as volatile components, water vapor, and any gaseous reaction products together in one work operation. As a result one can eliminate the expensive washing and drying of the powder after amalgamation.

The oxidation of the zinc powder can, for example, be so controlled by adjusting air supply or by an increase in the partial oxygen pressure that zinc oxide contents of 0.6–10% can be maintained continuously in the battery zinc powder, so that the zinc oxide content of the zinc powder can also be adjusted again prior to amalgamation.

Amalgamation in a closed, evacuable mixing vessel permits use of minimal environmental protection measures. It avoids the need to eliminate removal of mercury from the process air, as during spraying of mercury-zinc melt, and the action of mercury in the process air of a drier during amalgamation with use of aqueous alkalis and acids.

Another special advantage of the method according to the invention is that, surprisingly, one can adjust the pouring density through adjustment of the degree of oxidation. It was hitherto not known that one can exert a significant influence on the pouring density of the final powder in this manner.

It is furthermore known that the gas development of zinc powder can be reduced by the addition of certain alloying elements. Thus it is known that both pure zinc powder and also mercury-containing zinc powder produce a slightly smaller gas development if the zinc has a lead content of 0.05% by weight. An explanation of this observation so far is not known. For example, the gas development of a pure zinc powder can be twice as great as that of an identically made zinc powder to which, prior to pulverization, lead is added for the attainment of 0.05% by weight mercury. Furthermore, for example, the gas development of a 6% by weight zinc powder can be about 20% greater than that of an identically made zinc powder which, prior to pulverization, was alloyed with 0.05% by weight lead. Other alloying elements produce similar effects.

It has now been found quite surprisingly that gas development can be reduced considerably more if the alloying elements are not added to the zinc at the very beginning but if, instead, the zinc powder is amalgamated with metallic mercury which contains a part or the entire quantity of alloy elements in solution. Thus it was found, for example, that the gas development of a zinc powder, which was treated with a lead-mercury amalgam, so that it contains 6% by weight of mercury and 0.05% by weight of lead, is 60% lower than that produced with an identically made powder made from zinc-lead alloy with 0.05% by weight of lead which was subsequently amalgamated to 6% by weight of mercury. This considerable improvement in the property of zinc powder for alkaline batteries was not foreseeable.

One preferred version of carrying out the instant invention is thus a method wherein one reacts the zinc powder with metallic mercury which contains a part or the entire quantity of additional alloying elements to reduce the gas development in solution. The alloying elements can involve one or more members of the following series: gold, silver, tin, lead, cadmium, indium, thallium, gallium, and zinc.

To carry out this variation of the method of the invention, one uses a zinc powder which does not contain any or which contains only a part of the desired contents of the above-mentioned alloying elements. The reaction with metallic mercury, in which all or the remaining remnant of the quantity of desired alloying elements is dissolved, is accomplished in the usual manner. Preferred alloying elements are lead and lead with zinc.

Metallic mercury with a content of 0.1–2% by weight of lead can be made relatively simply because lead is dissolved considerably better in liquid mercury in heat than at room temperature. Already at 100° C. one can dissolve up to 15% by weight of lead in mercury. Because the amalgamation of the zinc powder, in general, is accomplished at temperatures between room temperature and 150° C., it is readily possible to make metallic mercury with a lead content of up to 2% by weight and to use it according to the invention.

The method according to the invention is explained in greater detail in the following examples. These examples are illustrative only and are not to be construed as limiting the invention in scope.

EXAMPLE 1

4.7 kg of zinc powder are introduced into a mixing vessel in which a partial oxygen pressure is adjusted to a level of 20 mbar by means of argon flushing. The double mantle of the mixing vessel is heated to 90° C. After temperature equalization between zinc powder and mixing system, the mixer is turned on and the zinc powder is thoroughly mixed. From a connected vessel, 0.6 l of 1% aqueous potassium hydroxide are added and thoroughly mixed with the zinc powder. Then 0.3 kg of mercury are added and likewise mixed with the zinc powder. The mixing is continued until the zinc powder is completely amalgamated and the water, introduced with the amalgamation aid, has been removed from the vessel by argon flushing. One can adjust the zinc oxide content between 0.6 and 10% through controlled elevation of the partial oxygen pressure in the mixing vessel to the value of the surrounding air. As the oxide content increase, the pouring density of the completely amalgamated zinc powder also increases.

In a typical case, the initial pouring density of the zinc powder was 2.7 kg/l. Under conditions which led to a content of 1% by weight of zinc oxide in the powder, the latter reveals a pouring density of 2.95 kg/l.

EXAMPLE 2

In a manner similar to Example 1, a content of 1.5% by weight zinc oxide in the zinc powder was achieved by means of a different rate in the rise of the partial oxygen pressure. After amalgamation, the powder revealed a pouring density of 3.2 kg/l.

EXAMPLE 3

In a manner similar to Example 1, the partial oxygen pressure was so raised that an oxide content of 3% by weight zinc oxide was obtained. After amalgamation, the powder revealed a pouring density of 3.6 g/cc.

As a result of the absorption of the mercury alone, in all the 3 examples the calculated pourring density is 2.85 g/cm$^3$ only.

EXAMPLE 4

4.7 kg zinc powder are placed into a closed mixing vessel. The partial oxygen pressure in the system is reduced to less than 60 mbar by means of flushing with argon gas. THe double mantle of the mixing vessel is heated to 90° C. After the attainment of temperature equality between the mixing vessel and the zinc powder, the stirring mechanism is started and the zinc powder is mixed thoroughly. During mixing, 0.6 of 1% KOH solution are introduced from a connected container and mixed thoroughly with the zinc powder. While stirring constantly, 0.3 kg of metallic mercury, with a lead content of 0.83% by weight, are inserted from a connected container. The mixing process is continued until the zinc powder has been completely amalgamated and the moisture, introduced along with the amalgamation aid, has been removed from the mixing vessel with the argon stream. Then oxygen is added to the argon until a partial pressure corresponding to normal ambient air is reached. Depending upon the speed of addition as well as the temperature of the zinc powder, one can achieve contents of 0.6–10% by weight ZnO in the zinc powder. As the oxygen content goes up, there is also an increase in the pouring density of the finished amalgamated zinc powder. The gassification test of the finished powder gave a value of $V_g = 0.08$ ml/g an hour. Similar values were obtained as a result of the use of a mercury which, in addition to 0.83% by weight of lead, also contained 0.05% by weight of zinc.

COMPARATIVE EXPERIMENT 1

A zinc powder was made in a manner similar to that described in Example 4, but the zinc powder already contained 0.05% by weight of lead and that the metallic mercury was free of lead. The gassification test of the powder thus obtained gave a value of $V_g = 0.16$ ml/g an hour.

COMPARATIVE EXPERIMENT 2

When Example 2 was repeated with a pure zinc powder and lead-free mercury, there was obtained a zinc powder which, during the gassification test, gave a value of $V_g = 2$ ml/g an hour.

I claim:

1. A method for making zinc powder having a mercury content of 0.1–10% by weight for use in alkaline batteries which comprises:
   (a) stirring zinc powder with metallic mercury in the presence of an amalgamation aid at 20°–150° C. in a closed system at a partial pressure of oxygen below 100 mbar;
   (b) continuously removing excess amalgamation aid, water vapor and any volatile products formed from the system; and
   (c) gradually raising the partial pressure of oxygen in the system to atmospheric pressure.

2. A method according to claim 1, wherein the temperature in steps (a) and (b) is 90° C.

3. A method according to claim 1, wherein the partial pressure of oxygen in steps (a) and (b) is below 20 mbar.

4. A method according to claim 1, wherein the amalgamation aid is a gas, dilute aqueous solution, dilute aqueous acid or dilute aqueous alkali.

5. A method according to claim 4, wherein the amalgamation aid is aqueous potassium, hydroxide, ammonia or carbonic acid.

6. A method according to claim 1, wherein pouring density of the zinc powder product is controlled by controlling the rate of increase in the partial pressure of oxygen during step (c).

7. A method according to claim 1, wherein zinc powder is mixed with metallic mercury having dissolved therein an alloying element to reduce gas development.

8. A method according to claim 4, wherein the zinc powder is mixed with metallic mercury containing dissolved therein an alloying element to reduce gas development.

9. A method according to claim 7, wherein the zinc powder reactant has incorporated therein part of the alloying element.

10. A method according to claim 7, wherein the alloying element is selected from the group consisting of gold, silver, tin, lead, cadium, indium, thallium, gallium and zinc.

* * * * *